United States Patent
Ahmavaara et al.

(10) Patent No.: US 7,835,317 B2
(45) Date of Patent: Nov. 16, 2010

(54) NETWORK SELECTION IN A WLAN

(75) Inventors: Kalle Ahmavaara, Helsinki (FI); Henry Haverinen, Tampere (FI)

(73) Assignee: Nokia Corporation, Espoo (FI)

( * ) Notice: Subject to any disclaimer, the term of this patent is extended or adjusted under 35 U.S.C. 154(b) by 1403 days.

(21) Appl. No.: 10/383,661

(22) Filed: Mar. 10, 2003

(65) Prior Publication Data
US 2004/0066756 A1    Apr. 8, 2004

Related U.S. Application Data

(60) Provisional application No. 60/416,587, filed on Oct. 8, 2002.

(51) Int. Cl.
*H04W 4/00* (2009.01)
*H04L 12/56* (2006.01)

(52) U.S. Cl. .................. 370/328; 370/329; 370/420

(58) Field of Classification Search .......... 370/328, 370/338, 331, 432.1, 329, 420, 230; 455/439, 455/426, 417, 414, 435.2, 432.1, 426.1, 414.1, 455/425.1; 709/225, 229; 707/10; 235/375
See application file for complete search history.

(56) References Cited

U.S. PATENT DOCUMENTS

| | | | |
|---|---|---|---|
| 5,610,919 A * | 3/1997 | Willard et al. ............. 370/336 |
| 5,914,668 A | 6/1999 | Chavez, Jr. et al. | |
| 5,956,640 A | 9/1999 | Eaton et al. | |
| 6,141,558 A | 10/2000 | Chen | |
| 6,295,447 B1 * | 9/2001 | Reichelt et al. ............ 455/417 |
| 6,799,038 B2 * | 9/2004 | Gopikanth ............... 455/435.2 |
| 6,868,416 B2 * | 3/2005 | Choi et al. ................... 707/10 |
| 6,873,622 B1 * | 3/2005 | Dodson et al. ............. 370/420 |
| 6,970,927 B1 * | 11/2005 | Stewart et al. ............. 709/225 |
| 7,200,112 B2 * | 4/2007 | Sundar et al. .............. 370/230 |
| 2001/0023446 A1 * | 9/2001 | Balogh ....................... 709/229 |

(Continued)

FOREIGN PATENT DOCUMENTS

WO    WO 2004/064437    7/2004

(Continued)

OTHER PUBLICATIONS

A Short Tutorial on Wireless LANs and IEEE 802.11, by Daniel L. Lough et al, The Bradley Department of Electrical and Computer Engineering and Virginia Polytechnic Institute and State University, Oct. 2, 2002, pp. 1-5.

(Continued)

*Primary Examiner*—Charles N Appiah
*Assistant Examiner*—Kiet Doan
(74) *Attorney, Agent, or Firm*—Mintz, Levin, Cohn, Ferris, Glovsky and Popeo, P.C.

(57) ABSTRACT

A method for user equipment (UE) resident in a wireless access network (WLAN) to obtain access to at least one other network is disclosed. The method includes storing the identification (SSID) of the at least one other network (visited PLMNs 1-3 and home PLMNs 4 and 5) in the user equipment; transmitting from the user equipment a request for connection to one of the at least one other network, which includes an identification of at least one of the at least one other network, to the wireless access network; and in response to the wireless access network receiving the identification, the user equipment is connected to the identified at least one other network through the wireless access network.

55 Claims, 1 Drawing Sheet

U.S. PATENT DOCUMENTS

| | | | |
|---|---|---|---|
| 2002/0022483 | A1 | 2/2002 | Thompson et al. |
| 2003/0003933 | A1* | 1/2003 | Deshpande et al. .......... 455/510 |
| 2003/0092444 | A1* | 5/2003 | Sengodan et al. ........... 455/436 |
| 2003/0121967 | A1* | 7/2003 | Goldberg et al. ............ 235/375 |
| 2003/0129971 | A1* | 7/2003 | Gopikanth .................. 455/414 |
| 2003/0134636 | A1 | 7/2003 | Sundar et al. |
| 2003/0139180 | A1* | 7/2003 | McIntosh et al. ............ 455/426 |
| 2003/0142641 | A1* | 7/2003 | Sumner et al. .............. 370/328 |

OTHER PUBLICATIONS

IEEE Std. 802.11a-1999, Part 11: Wireless LAN Medium Access Control (MAC) and Physical Layer (PHY) specifications—High-speed Physical Layer in the 5 GHz Band, pp. I-viii, and 1-83.

IEEE Std. 802.11b-1999, Part 11: Wireless LAN Medium Access Control (MAC) and Physical Layer (PHY) specifications—Higher-speed Physical Layer Extension in the 2.4 GHz Band, pp. I-vii, and 1-89.

Supplemental European Search Report for EP Application 03807945, dated Apr. 11, 2007.

Research In Motion et al.; "WLAN Network Selection" 3GPP TSG-SA2 Meeting #32, May 12, 2002, pp. 1-4, XP002320250.

NOKIA: "PLMN Selection for 802.11 type of WLAN", 3GPP TSG SA2 #31, Apr. 7, 2003, XP002320251.

Second Office Action dated May 22, 2009, issued by the State Intellectual Property Office (SIPO) of the People's Republic of China, in connection with counterpart application 2003801011588.

* cited by examiner

NETWORK SELECTION IN A WLAN

CROSS REFERENCE TO RELATED APPLICATION

This application claims the benefit of the filing date of Provisional Patent Application Ser No. 60/416,587, filed on Oct. 8, 2002, entitled "Network Selection in WLAN", which application is incorporated herein by reference in its entirety.

BACKGROUND OF THE INVENTION

1. Field of the Invention

The present invention relates to a system and method of network selection by user equipment (UE) in an access network such as a wireless local area network (WLAN).

2. Description of the Prior Art

In the WLAN specification (IEEE 802.11a and b which is incorporated herein by reference in its entirety), a WLAN can inform a UE of a service set identifier (SSIDs) (length 32 octets) of networks which are connectable thereto. Typically in WLAN systems, the WLAN SSID field includes a "network name". This network name is freely selectable ASCII string by the WLAN provider. It is typically something like "WLAN NW XYZ " or "Mr Smith WLAN" or "NOKIA WLAN". These types of names are used manually by the user to select the network to which to connect. However this requires a priori knowledge about the capabilities of the network having a certain name. This type of usage is acceptable for private networks to which the user typically always connects to a small number of WLAN networks.

However, the user cannot have global knowledge of all the WLAN network names (SSIDs) and their capabilities. Therefore, the user is unable to select the best network or to even have a feasible option of choosing from a list of provided network names.

In cellular systems the network selection operates by the cellular networks broadcasting their public land mobile telephone (PLMN) identification (ID). The UEs may make automatic network selection based on preferences stored in a GSM subscriber identity module (SIM) or a universal subscriber identity module (USIM) made by the operator or by user. The UE allows the user to make a manual selection when the UE browses available PLMNs. The UE converts the PLMNs to user friendly network names from internal memory and the user selects the desired network.

In GSM and GPRS systems, a PLMN-ID is linked to a branded network based on stored information in the UE.

SUMMARY OF THE INVENTION

The invention provides a mechanism for a UE resident in an access network, such as a WLAN, to select a connection to another network through the access network. The selection operates as follows:

1. A WLAN Access Point (AP) broadcasts SSIDs to provide an indication to the UE of available backbone networks (e.g. national PLMNs) accessible via the WLAN access zone (AZ).
2. The UE may select the access network manually by user intervention or automatically. Automatic selection is based on the signal strength and on the availability of preferred PLMNs or other preferred backbone networks.
3. The UE selects the backbone network based on the available SSIDs. SSIDs containing a PLMN-ID may be linked to branded networks based on the information stored in WLAN UE client software.
4. When connecting to a network, the UE indicates the selected roaming network (e.g. a PLMN) in a realm part of a network access identifier (NAI) user identity sent to the network.
5. The WLAN Access network routes the connection establishment to a backbone network (e.g. a visited PLMN) based on the attached NAI user ID realm part derived from the selected SSID.

A method for user equipment resident in a wireless access network to obtain access to at least one other network including storing an identification of the at least one other network in the user equipment; transmitting from the user equipment a request for connection to one of the at least one other network, which includes an identification of at least one of the at least one other network, to the wireless access network; and in response to the wireless access network receiving the identification, the user equipment is connected to the identified at least one other network through the wireless access network. In the request for connection to one of the at least one network, the identification of the at least one of the at least one other network or network types may comprise a wild card which represents multiple allowable combinations of other networks or network types which may be selected. The identification of the at least one other network may be transmitted from the wireless access network to the user equipment prior to storage therein. The at least one other network may be a home network or a roaming network. The user equipment solicitates an identification of the at least one network from the wireless access network prior to a request for connection to one of the at least one network. The identification of the at least one other network may be contained in a service set identifier in accordance with IEEE 802.11(a or b) which identifies the at least one other network as a public land mobile network. The service set identifier may include fields comprising a field identifying a network type which identifies the network type as a public land mobile network, a field identifying a country code where the at least one public land mobile network is located and a field identifying at least one public land mobile network to which the request for connection is to be routed. The identification of the at least one network may be contained in a service set identifier in accordance with IEEE 802.11(a or b) which identifies the at least one other network as being a network type other than a public land mobile network and the service set identifier may include fields comprising a field which defines a network type of the at least one other network and a field which identifies the at least one other network.

According to another aspect of the invention, a method is provided for a UE to obtain access to at least one other network via an access network, the at least one other network being accessible via the access network, the method comprising: providing the access network with at least one access network identification associated with the at least one other network; and the UE derives, an identification of the at least one other network from the at least one access network identification. The user equipment may utilize at least one access network identification when establishing a connection to the at least one other network. The access network may route the connection of the UE to at least one other network associated with the at least one access network identification. At least one access network identification may be transmitted from the access network to the UE prior to the connection of the UE to the access network. The UE may acquire at least one access network identification utilized by the access network prior to the connection and the access network identification may contain at least one field. The at least one other network may be a public land mobile network (PLMN). The at least one other network may be a roaming PLMN network connected to a home PLMN network. The access network may be a WLAN. The access network identification may be contained in a service set identifier in accordance with IEEE 802.11(a or b). The access network identification may be mapped to a PLMN ID of the at least one other network.

According to another embodiment of the invention, a service set identifier is provided, which is delivered in an access network including at least one identifier of a backbone network, the service set identifier comprising an indication of the backbone network type, a version number of the service set identifier type, and an identification of the backbone network. In the case when the backbone network is a PLMN, the identification of the backbone network comprises a country code corresponding to the country in which the backbone network is located and a network code identifying the backbone network. Further, the access network is a WLAN.

A service set identifier delivered in an access network in accordance with the invention comprises an embedded identification of a backbone network for connection to the access network. The service set identifier may conform to a predefined structure. In a case when the backbone network is a public land mobile network, the identification of the backbone network comprises a country code corresponding to the country in which the backbone network is located and a network code identifying the backbone network. The access network may be a wireless local area network.

A system in accordance with the invention includes a wireless access network; at least one other network accessible via the wireless access network; and user equipment resident in the wireless access network; and wherein the identification of the at least one other network is stored in the user equipment, a request for connection to one of the at least one other network, which includes an identification of at least one of the at least one other network, is transmitted from the user equipment to the wireless access network and in response to the wireless access network receiving the identification, the user equipment is connected to the identified at least one other network through the wireless access network. The identification of the at least one other network may be transmitted from the wireless access network to the user equipment prior to storage therein. The user equipment may solicitate an identification of the at least one network from the wireless access network prior to a request for connection to one of the at least one other network. The at least one other network may be a home network or is a roaming network. The service set identifier may include fields comprising a field identifying a network type which identifies the network type as a public land mobile network, a field identifying a country code where the at least one public land mobile network is located and a field identifying at least one public land mobile network to which the request for connection is to be routed. The identification of the at least one network may be contained in a service set identifier in accordance with part a or b of IEEE 802.11 which identifies the at least one other network as being a network type other than a public land mobile network. The service set identifier may include fields comprising a field which defines a network type of the at least one other network and a field which identifies the at least one other network.

A system in accordance with the invention includes a wireless access network; at least one other network accessible via the wireless access network; user equipment; and wherein the access network is provided with at least one access network identification associated with the at least one other network and the UE derives an identification of the at least one other network from the at least one access network identification. The user equipment may utilize at least one access network identification when establishing a connection to the at least one other network. The access network may route the connection of the UE to at least one other network associated with the at least one access network identification. At least one access network identification may be transmitted from the access network to the UE prior to the connection of the UE to the access network. The access network identification may contain at least one field. The at least one other network may be a PLMN network. The at least one other network may be a roaming PLMN network connected to a home PLMN network. The access network may be a WLAN. The access network identification may be contained in a service set identifier in accordance with parts a or b of IEEE 802.11. The access network identification may be mapped to a PLMN ID of the at least one other network.

DESCRIPTION OF THE PREFERRED EMBODIMENTS

Figure 1:
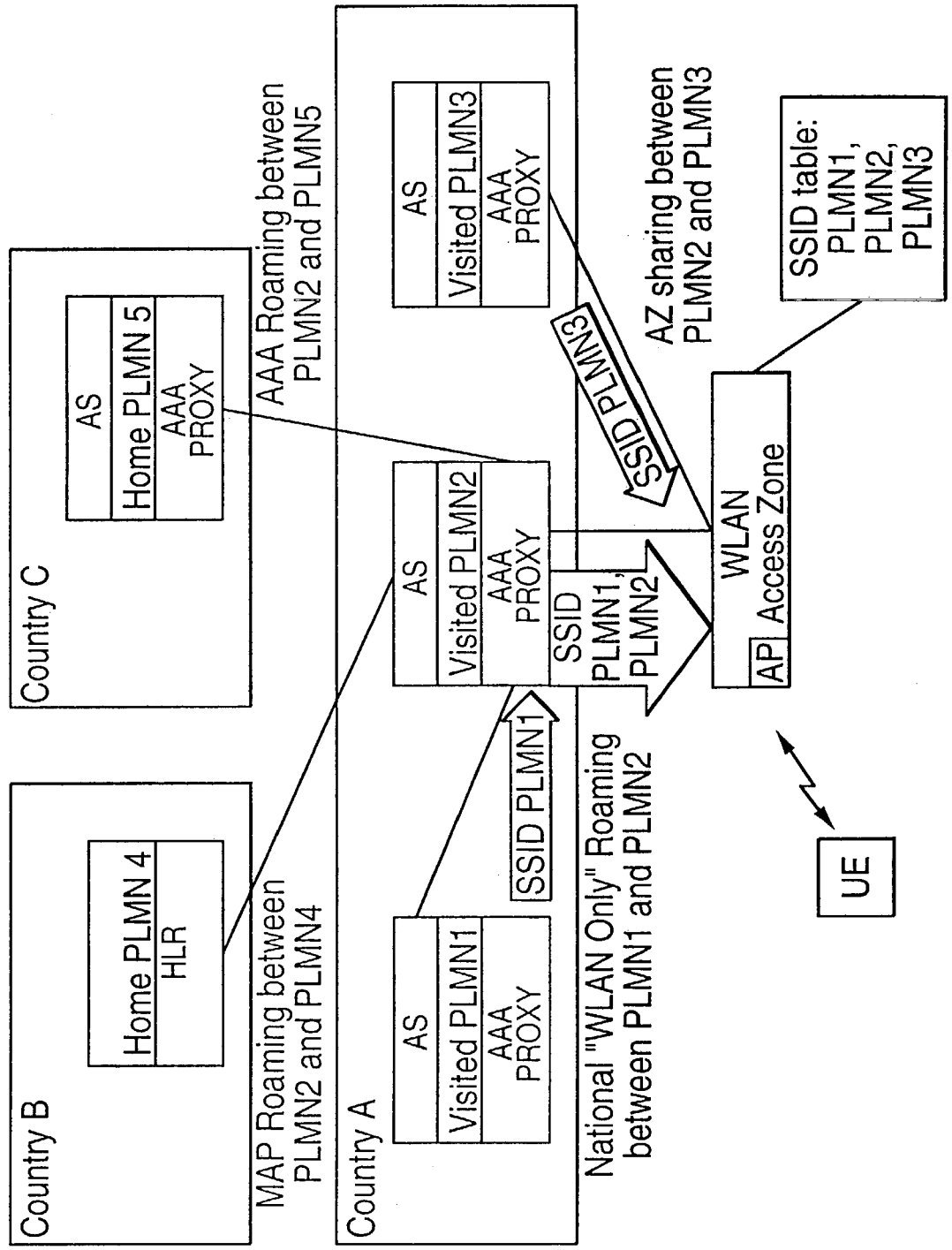
FIG. 1 illustrates an exemplary system in which the present invention may be practiced including the relationship of SSIDs dependent upon the in place state of roaming, interworking and sharing relationships.

With reference to FIG. 1, network selection involves two parts:
WLAN Access Zone Selection
Visited Network (e.g. PLMN) Selection
WLAN Network access zone selection may operate as follows:
The UE always tries first to connect directly to the home network which is Home PLMN 4 which includes the UE's home location register (HLR). If the home network is not available, the UE tries to connect via preferred backbone networks. Selection of the backbone network can be automatic, user assisted, solicited by the user equipment or done manually by the user of the UE. The communication of the SSID's from visited PLMN's 1 and 3 to the visited PLMN2 is illustrated as the arrows SSID PLMN1 and SSID PLMN2 being transmitted to the visited PLMN2. The visited PLMN2 transmits the identity SSIDs of the visited PLMN1 and the PLMN2 to the WLAN access zone. Also, the identity of SSID of the PLMN3 is passed directly to the WLAN access zone. The passing of the SSID's to the WLAN access zone may be done directly. Each of the visited PLMN's 1-3 and the home PLMN5 have an access stratum AS.

The information about available backbone networks is communicated by the WLAN AP to the UE in the form of WLAN SSIDs.

The UE may map each SSID to a backbone network. The UE may then select to which of the available backbone networks it desires to connect. [This selection can be automatic, assisted by the user or manually done by the user.] After selection, the UE associates with the access network, such as the visited PLMN2, using the SSID corresponding to that selected backbone network.

The SSIDS may use "wild cards" in the designation of countries and/or network types. A wild card represents a choice of any network characterizing property from a group of properties, such as country or network type from a group of countries or a group of networks of a particular type. For example, the designation may be "any type 1 PLMN in a Finland" in which the PLMN type and country code are fixed, but the mobile network code is replaced by a wild card, which designates any mobile network. In a text form "wild cards" may be various characters, such as "?", "+" or"*", which have an agreed wild card designation meaning so that their use in place of a network characterizing property indication, such as country and/or a network type designation indicates that any country and/or any network within a group of networks of a particular type in a particular country may be used. For example, the country code may be replaced with a wild card to indicate that the SSID refers to "any Orange PLMN" in any country.

The access network (visited PLMN2 as illustrated) routes the connection further to a correct backbone network based on the selected SSID, such as visited PLMN1 or home PLMNs 4 or 5. For example, for each SSID associated with a backbone network, tunneling may be used to transfer all data between the access network and the backbone network. Thus the routing to and from the backbone network may be considered as tunnel mapping. The tunnel could be e.g. a GRE tunnel, virtual LAN, L2TP, dedicated Layer 3 connection or any other similar transport mechanism.

In another exemplary embodiment, each SSID associated with a backbone network can be automatically converted to an Authentication, Authorization and Accounting (AAA) realm name, such as Remote Authentication Dial In User Server (RADIUS) realm name or a DIAMETER realm name pointing to a AAA server within the backbone network. The realm name entity is present in visited PLMNs 1-3 and home PLMN5 as a AAA proxy. In the following example, RADIUS is used as an exemplary AAA method.

When the UE has selected the SSID, the UE creates the RADIUS realm from the selected SSID and adds this realm to the end of the user identity complying to the network access identifier (NAI) format. Since the concatenated user identity complies with the NAI format, the authentication is first routed to the selected backbone network. The backbone network strips away the concatenated part from the original NAI and forwards the signalling further to at least one additional network to which the UE desires to be connected such as connection from visited PLMN2 to visited PLMN1 and one of the home PLMNs 4 or 5.

1. USAGE OF IDENTIFIERS

A. Setting SSID Value

1. SSID for a PLMN backbone network:

If a PLMN is a backbone network for a WLAN Access Zone, the SSID pointing to that PLMN could be, e.g. following type of format:

[Reserved word for PLMN type of network SSIDs] [Version Number] [MCC] [MNC] [Free text]

where

Reserved word for PLMN type of network SSIDs distinguishes this type of SSIDs from other SSIDs Version number enables changing the format in the future Mobile Country Code (MCC) is the PLMN Country code Mobile Network Code (MNC) is the PLMN Network code Free text can be used, for example, to indicate a user friendly network name The actual contents of the SSID fields may vary from the ones suggested above, and the indicated contents are intended to be an example of how the SSID field configuration may be implemented.

2. SSID for non PLMN backbone network:

If the backbone network is not a PLMN, the SSID pointing to that network may be of format:

[Reserved word for non PLMN type of network SSIDs] [Version Number] [Network Name]

where

Reserved word for non PLMN type of network SSIDs distinguishes this type of SSID from other SSIDs Version number enables changing the format in the future Network name is the name of the backbone network The actual contents of the SSID information fields may vary and the indicated contents are intended to be an example, without limitation, of how the SSID field configuration may be implemented.

II. CONFIGURATION OF SSIDs

A. National WLAN Roaming Between Backbone Networks:

If a backbone network has a national roaming agreement with another backbone network not directly connected to the same WLAN AZ then:

the provider of the non connected backbone network may provide its SSID to the provider of the connected backbone network the connected backbone network may update its SSID as well as the received SSIDs of any national roaming partner networks to the WLAN access zone (AZ).

The WLAN AP may store all the supported SSIDs into a SSID list within the WLAN AP.

B. Shared WLAN Access Zone:

A shared WLAN AZ may include all the SSIDs provided by all the backbone networks with whom the WLAN AZ provider has an interworking agreement for providing WLAN access service.

The WLAN AP may store all the supported SSIDs into a SSID list within WLAN AP.

Delivering of SSID Information to the UE May Be As Follows:

In the 802.11 b beacon frame, the WLAN UE receives only a beacon SSID. This SSID may be of the above format and thus may be already used for backbone network selection by the UE. The UE may also store a preferred network based on broadcast SSIDs for facilitating forthcoming association with a network.

If the UE supports active scanning of the SSID information, the UE may start scanning for available networks in a preferred order.

First, the UE may scan for its home PLMN SSID. If there is no response from WLAN AP, then the WLAN UE may start scanning preferred roaming partners. To facilitate guessing available roaming partners, the UE may guess the country where it is located.

The following things can be done:

The UE may always first assume it to be in its home country and thus scan national roaming SSIDs The UE may store the most frequently visited countries and use that information for selecting SSIDs to scan A dual mode UE may check the attached cellular network and use that information for selecting SSIDs to scan The UE may request the user to indicate in which country the WLAN UE located The UE may randomly start to scan the available SSIDs The WLAN UE may also use a wild card when searching for proper SSIDs. For example, the WLAN UE may request availability of SSIDs containing a specific string followed by any string. The WLAN UE may also request the WLAN AP to indicate all supported SSIDs.

Selecting a WLAN Access Network (AN)

The UE may select an WLAN AN based on signal strength and based on availability of a home PLMN or a preferred backbone roaming network SSIDs.

The home network PLMN ID can be derived from the users International Mobile Subscriber Identity (IMSI) available from a SIM or a USIM.

For selecting a preferred roaming PLMN, a PLMN preference list stored in a SIM or a USIM may be used.

Selection of Backbone Network and Storage by the UE

The UE supporting network selection may implement automatic or/and manual selection of a roaming network. The identification of the roaming network may be transmitted from the wireless access network to the UE for storage and may be in response to a solicitation by the user equipment of an identification the roaming network. The identification of the roaming network may be contained in a service set identifier in accordance with parts a or b of IEEE 802.11.

Setting the User ID NAI Realm Part by the UE

Before sending a Extensible Authentication Protocol (EAP) Identity Response, the UE may select the backbone network to which connection is made.

If the UE does not support this feature, the UE utilizes its home network realm and it is up to the implementation to decide the RADIUS routing of the identity towards the home PLMN AAA proxy server.

If the WLAN UE supports the roaming network selection, the UE may select to which of the available backbone networks the WLAN AN may direct the user. The result of the selection may be visible in the utilized realm part as follows:

Instead of the original user ID allocated by the home network:

[userid]@[homeASrealm],

The UE may utilize the following user ID in EAP Identity Response:

[userid]@[homeASrealm].[selectedbackbonenetworkSSID].[OWLAN.ORG]

RADIUS Routing by Network Radius Proxies

RADIUS proxies receiving the above user NAI, check from their "RADIUS routing tables" for the forwarding of the message. The routing is based on the "most significant bits" of the realm, i.e. according to the inserted [selectedbackbonenetworkSSID].[WLAN.ORG] part.

When the RADIUS Access Request reaches the RADIUS server identified by the [selectedbackbonenetworkSSID].[WLAN.ORG] realm, the RADIUS server strips away the inserted part and performs the authentication of the user based on the remaining NAI.

Alternatively, the UE may always use its home network NAI as its user identity independently of the backbone network selection. In this case the WLAN UE indicates the selected SSID when connecting to the access network. The access network then routes the connection further to the backbone network associated with the utilized SSID. This may, for example, be accomplished by pre-configured tunnels between the access network and each backbone network.

The user authentication to be performed may still involve AAA roaming (proxying) or mobile application part (MAP) roaming towards the users home network. This further roaming is not however impacted by the new PLMN selection feature.

The invention provides a mechanism of how a PLMN-ID (identifying a Mobile Operator network) can be provided to the UE by using a SSID field.

When the PLMN ID is included within the SSID field, cellular network selection is possible for Public WLAN networks interworking with the cellular system. This enables global scalability and automatic network selection for a WLAN.

With the invention, a PLMN ID is included in a SSID field permitting recognition by accessing UEs of the PLMN ID information used for network selection by the UE or its user.

If the UE includes the selected SSID with EAP signalling between the UE and the home network, the home network has the ability to check that the WLAN AZ and the roaming partner have followed the UEs network selection and not routed the connection to a network e.g. giving highest roaming fee for the roaming partner. The home network may compare the PLMN ID derived from the SSID inserted by the UE to the origin of the received authentication request and if there is mismatch, the WLAN Access network or roaming partner is determined to not be behaving correctly.

The invention claimed is:

1. A method, comprising:
receiving, at a user equipment from a wireless local area network access point of a wireless local area network, a service set identifier including an identification of at least one other network comprising a public land mobile network;
storing in the user equipment resident in the wireless local area network the identification of the at least one other network;
transmitting, from the user equipment to the wireless local area network access point of the wireless local area network, a request to connect to the at least one other network, the request including the identification of the at least one other network comprising the public land mobile network, wherein the identification comprising:
the service set identifier including the identification of the at least one other network comprising the public land mobile network
a country code where the public land mobile network is located,
and
a field identifying the public land mobile network to which the request for connection is to be routed; and
connecting, in response to the transmitted request, the user equipment to the identified other network through the wireless local area network access point of the wireless local area network.

2. A method in accordance with claim 1, wherein the identification is transmitted from the wireless local area network access point to the user equipment prior to storage therein.

3. A method in accordance with claim 1, wherein the user equipment solicits the identification prior to a request for connection to the other network.

4. A method in accordance with claim 3, wherein
the solicitation includes a wild card as a part of the identification of the other network.

5. A method in accordance with claim 1, wherein the identified other network is a home network.

6. A method in accordance with claim 1, wherein the identified other network is a roaming network.

7. A method, comprising:
storing in a user equipment resident in a wireless access network an identification of at least one other network;
transmitting from the user equipment a request for connection to one of the at least one other network, which includes an identification of at least one of the at least one other network, to the wireless access network; and in response to the wireless access network receiving the identification, connecting the user equipment to the identified at least one other network through the wireless access network, wherein the identification of the at least one other network is contained in a service set identifier in accordance with IEEE 802.11 which identifies the at least one other network as a public land mobile network, and the service set identifier includes fields comprising a field identifying a network type which identifies the network type as a public land mobile network, a field identifying a country code where the at least one public land mobile network is located, and a field identifying at least one public land mobile network to which the request for connection is to be routed.

8. A method in accordance with claim 7, wherein the service set identifier includes fields comprising a field which defines a network type of the at least one other network and a field which identifies the at least one other network.

9. A method, comprising:

obtaining access by a user equipment to at least one other network via an access network, the at least one other network being accessible via the access network;

providing the access network with at least one access network identification associated with the at least one other network, the at least one access network identification comprises a service set identifier in accordance with IEEE 802.11; and deriving by the user equipment an identification of the at least one other network from the at least one access network identification, wherein said providing further comprises providing at least one of, an identification which identifies the at least one other network as a public land mobile network, a country code where the at least one public land mobile network is located, and a field identifying at least one public land mobile network to which the request for connection is to be routed.

10. A method in accordance with claim 9, wherein the user equipment utilizes at least one access network identification when establishing a connection to the at least one other network.

11. A method in accordance with claim 10, wherein the access network routes the connection of the user equipment to at least one other network associated with the at least one access network identification.

12. A method in accordance with claim 11, wherein at least one access network identification is transmitted from the access network to the user equipment prior to the connection of the user equipment to the access network.

13. A method in accordance with claim 12, wherein the user equipment acquires at least one access network identification utilized by the access network prior to the connection of the user equipment to the access network.

14. A method in accordance with claim 13, wherein the access network identification contains at least one field.

15. A method in accordance with claim 10, wherein the at least one other network is a roaming public land mobile network connected to a home public land mobile network.

16. A method in accordance with claim 9, wherein the at least one other network is a public land mobile network.

17. A method in accordance with claim 9, wherein the access network is a wireless local area network.

18. A method in accordance with claim 9, wherein the access network identification is mapped to a public land mobile network identifier of the at least one other network.

19. An apparatus, comprising:

a transmitter configured to transmit a service set identifier in a wireless local area network, the service set identifier configured in accordance with IEEE 802.11 comprising an indication of a backbone network type, a version number of a service set identifier type, and an identification of a backbone network, wherein the service set identifier further comprises at least one of, an identification which identifies the at least one other network as the public land mobile network, a country code where the at least one public land mobile network is located, and a field identifying the at least one public land mobile network to which the request for connection is to be routed.

20. The apparatus in accordance with claim 19, wherein when the backbone network is a public land mobile network, the identification of the backbone network includes a country code corresponding to the country in which the backbone network is located and a network code identifying the backbone network.

21. The apparatus in accordance with claim 19, wherein the access network is a wireless local area network.

22. An apparatus, comprising:

a transmitter configured to transmit a service set identifier in an access network, said service set identifier comprising an embedded identification of a backbone network for connection to the access network, and wherein the service set identifier further comprises at least one field which represents at least one of, an identification which identifies the at least one other network as a public land mobile network, wherein the service set identifier is configured in accordance with IEEE 802.11 and includes the identification of the at least one other network, a country code where the at least one public land mobile network is located, and a field identifying at least one public land mobile network to which the request for connection is to be routed.

23. The apparatus in accordance with claim 22, wherein the service set identifier conforms to a predefined structure.

24. The apparatus in accordance with claim 22, wherein in a case when the backbone network is a public land mobile network, the identification of the backbone network comprises a country code corresponding to the country in which the backbone network is located and a network code identifying the backbone network.

25. The apparatus in accordance with claim 22, wherein the access network is a wireless local area network.

26. A system, comprising:

a wireless access network;

at least one other network accessible via the wireless access network; and user equipment resident in the wireless access network, wherein the identification of the at least one other network is stored in the user equipment, a request for connection to one of the at least one other network, which includes an identification of at least one of the at least one other network, is transmitted from the user equipment to the wireless access network and in response to the wireless access network receiving the identification, the user equipment is connected to the identified at least one other network through the wireless access network, wherein said transmission to said wireless access network further comprises at least one of, an identification which identifies the at least one other network as a public land mobile network, the identification of the at least one other network is contained in a service set identifier in accordance with IEEE 802.11 identifying the at least one other network as a public land mobile network, a country code where the at least one public land mobile network is located, and a field identifying at least one public land mobile network to which the request for connection is to be routed.

27. A system in accordance with claim 26, wherein the identification of the at least one other network is transmitted from the wireless access network to the user equipment prior to storage therein.

28. A system in accordance with claim 26, wherein the user equipment solicits an identification of the at least one network from the wireless access network prior to a request for connection to one of the at least one other network.

29. A system in accordance with claim 26, wherein the at least one other network is a home network.

30. A system in accordance with claim 26, wherein the at least one other network is a roaming network.

31. A system, comprising:
a wireless access network;
at least one other network accessible via the wireless access network; and
user equipment resident in the wireless access network, wherein
the identification of the at least one other network is stored in the user equipment, a request for connection to one of the at least one other network, which includes an identification of at least one of the at least one other network, is transmitted from the user equipment to the wireless access network and in response to the wireless access network receiving the identification, the user equipment is connected to the identified at least one other network through the wireless access network, the identification of the at least one other network is contained in a service set identifier in accordance with IEEE 802.11 identifying the at least one other network as a public land mobile network,
the at least one other network is a roaming network, and
the service set identifier includes fields comprising a field identifying a network type which identifies the network type as a public land mobile network, a field identifying a country code where the at least one public land mobile network is located, and a field identifying at least one public land mobile network to which the request for connection is to be routed.

32. A system in accordance with claim 31, wherein the service set identifier includes fields comprising a field which defines a network type of the at least one other network and a field which identifies the at least one other network.

33. A system, comprising:
a wireless access network;
at least one other network accessible via the wireless access network; and
user equipment, wherein
the access network is provided with at least one access network identification associated with the at least one other network and the user equipment derives an identification of the at least one other network from the at least one access network identification, the access network identification is contained in a service set identifier in accordance IEEE 802.11, wherein the wireless access network is further provided with at least one of, an identification which identifies the at least one other network as a public land mobile network, a country code where the at least one public land mobile network is located, and a field identifying at least one public land mobile network to which the request for connection is to be routed.

34. A system in accordance with claim 33, wherein the user equipment utilizes at least one access network identification when establishing a connection to the at least one other network.

35. A system in accordance with claim 34, wherein the access network routes the connection of the user equipment to at least one other network associated with the at least one access network identification.

36. A system in accordance with claim 35, wherein at least one access network identification is transmitted from the access network to the user equipment prior to the connection of the user equipment to the access network.

37. A system in accordance with claim 36, wherein the access network identification contains at least one field.

38. A system in accordance with claim 34, wherein the at least one other network is a roaming public land mobile network connected to a home public land mobile network.

39. A system in accordance with claim 33, wherein the at least one other network is a public land mobile network.

40. A system in accordance with claim 33, wherein the access network is a wireless local area network.

41. A system in accordance with claim 33, wherein the access network identification is mapped to a public land mobile network identifier of the at least one other network.

42. A method, comprising:
transmitting from a user equipment resident in a wireless access network to said wireless access network a communication regarding at least one of at least one other network to which the user equipment desires to obtain access, which includes an identification of the at least one of the at least one other network, the identification of the at least one of the at least one other network originating in a communication from the at least one of the at least one other network which identification has been received from the user equipment, the identification of the at least one other network is contained in a service set identifier in accordance with IEEE 802.11 identifying the at least one other network as a public land mobile network, wherein said transmitting further comprises transmitting to the access network at least one of, an identification which identifies the at least one other network as a public land mobile network, a country code where the at least one public land mobile network is located, and a field identifying at least one public land mobile network to which the request for connection is to be routed, and in response to the wireless access network receiving the identification, the user equipment is connected to the identified at least one other network through the wireless access network.

43. A method in accordance with claim 42, wherein the identification of the at least one other network is transmitted from the wireless access network to the user equipment and is stored therein.

44. A method in accordance with claim 42, wherein the user equipment solicits an identification of the at least one network from the wireless access network prior to a request for connection to one of the at least one other network.

45. A method in accordance with claim 42, wherein the at least one other network is a home network.

46. A method in accordance with claim 42, wherein the at least one other network is a roaming network.

47. A method, comprising:

transmitting from a user equipment resident in a wireless access network to said wireless access network a communication regarding at least one of at least one other network to which the user equipment desires to obtain access, which includes an identification of the at least one of the at least one other network, the identification of the at least one of the at least one other network originating in a communication from the at least one of the at least one other network which identification has been received from the user equipment; and in response to the wireless access network receiving the identification, the user equipment is connected to the identified at least one other network through the wireless access network, wherein the identification of the at least one other network is contained in a service set identifier in accordance with IEEE 802.11 which identifies the at least one other network as a public land mobile network, and the service set identifier includes fields comprising a field identifying a network type which identifies the network type as a public land mobile network, a field identifying a country code where the at least one public land mobile network is located and a field identifying at least one public land mobile network to which the request for connection is to be routed.

48. A method in accordance with claim 47, wherein the service set identifier includes fields comprising a field which defines a network type of the at least one other network and a field which identifies the at least one other network.

49. A system, comprising:

a wireless access network;

at least one other network accessible via the wireless access network; and a user equipment storing an identification of the at least one other network, wherein a request for connection to one of the at least one other network, which includes an identification of at least one of the at least one other network, is transmitted from the user equipment to the wireless access network and, in response to the wireless access network receiving the identification, the user equipment is operatively connected to the identified at least one other network through the wireless access network, wherein the user equipment further transmits to the wireless access network at least one of, an identification which identifies the at least one other network as a public land mobile network, the identification of the at least one network is contained in a service set identifier in accordance with IEEE 802.11 identifying the at least one other network as being a network type other than a public land mobile network, a country code where the at least one public land mobile network is located, and a field identifying at least one public land mobile network to which the request for connection is to be routed.

50. A system in accordance with claim 49, wherein the identification of the at least one other network is transmitted from the wireless access network to the user equipment.

51. A system in accordance with claim 49, wherein the user equipment solicits an identification of the at least one network from the wireless access network prior to a request for connection to one of the at least one other network.

52. A system in accordance with claim 49, wherein the at least one other network is a home network.

53. A system in accordance with claim 49, wherein the at least one other network is a roaming network.

54. A system, comprising:

a wireless access network;

at least one other network accessible via the wireless access network; and a user equipment storing an identification of the at least one other network, wherein a request for connection to one of the at least one other network, which includes an identification of at least one of the at least one other network, is transmitted from the user equipment to the wireless access network and, in response to the wireless access network receiving the identification, the identification of the at least one network is contained in a service set identifier in accordance with IEEE 802.11 identifying the at least one other network as being a network type other than a public land mobile network, the user equipment is operatively connected to the identified at least one other network through the wireless access network, the at least one other network is a roaming network, and the service set identifier includes fields comprising a field identifying a network type which identifies the network type as a public land mobile network, a field identifying a country code where the at least one public land mobile network is located and a field identifying at least one public land mobile network to which the request for connection is to be routed.

55. A system in accordance with claim 54, wherein the service set identifier includes fields comprising a field which defines a network type of the at least one other network and a field which identifies the at least one other network.

* * * * *